United States Patent [19]
Lips

[11] 3,962,921
[45] June 15, 1976

[54] COMPENSATED PRESSURE TRANSDUCER

[75] Inventor: Donald C. Lips, San Pedro, Calif.

[73] Assignee: The Garrett Corporation, Los Angeles, Calif.

[22] Filed: Sept. 7, 1973

[21] Appl. No.: 395,320

Related U.S. Application Data

[63] Continuation of Ser. No. 223,462, Feb. 4, 1972, abandoned.

[52] U.S. Cl. .............................. 73/398 C; 317/246
[51] Int. Cl.² ......................................... G01L 9/12
[58] Field of Search ............. 73/398 R, 388, 398 C, 73/393, 407 R; 317/246

[56] References Cited
UNITED STATES PATENTS

| | | |
|---|---|---|
| 2,482,440 | 9/1949 | Rylsky .............................. 73/398 C |
| 3,040,583 | 6/1962 | Post ................................. 73/398 R |
| 3,356,963 | 6/1966 | Buck ................................ 73/398 C |
| 3,814,998 | 6/1974 | Thoma et al. .................... 73/398 C |

Primary Examiner—Donald O. Woodiel
Attorney, Agent, or Firm—Orville R. Seidner; Ben E. Lofstedt; Joel D. Talcott

[57] ABSTRACT

A pair of diaphragms with substantially equal natural frequencies are superposed for movement in phase and in unison under accelerating forces, with electrical capacitor plates deposited on adjacent surfaces which provide an electrical measure of the differential diaphragm stressing with one of the diaphragms subject to a fluid pressure differential.

13 Claims, 7 Drawing Figures

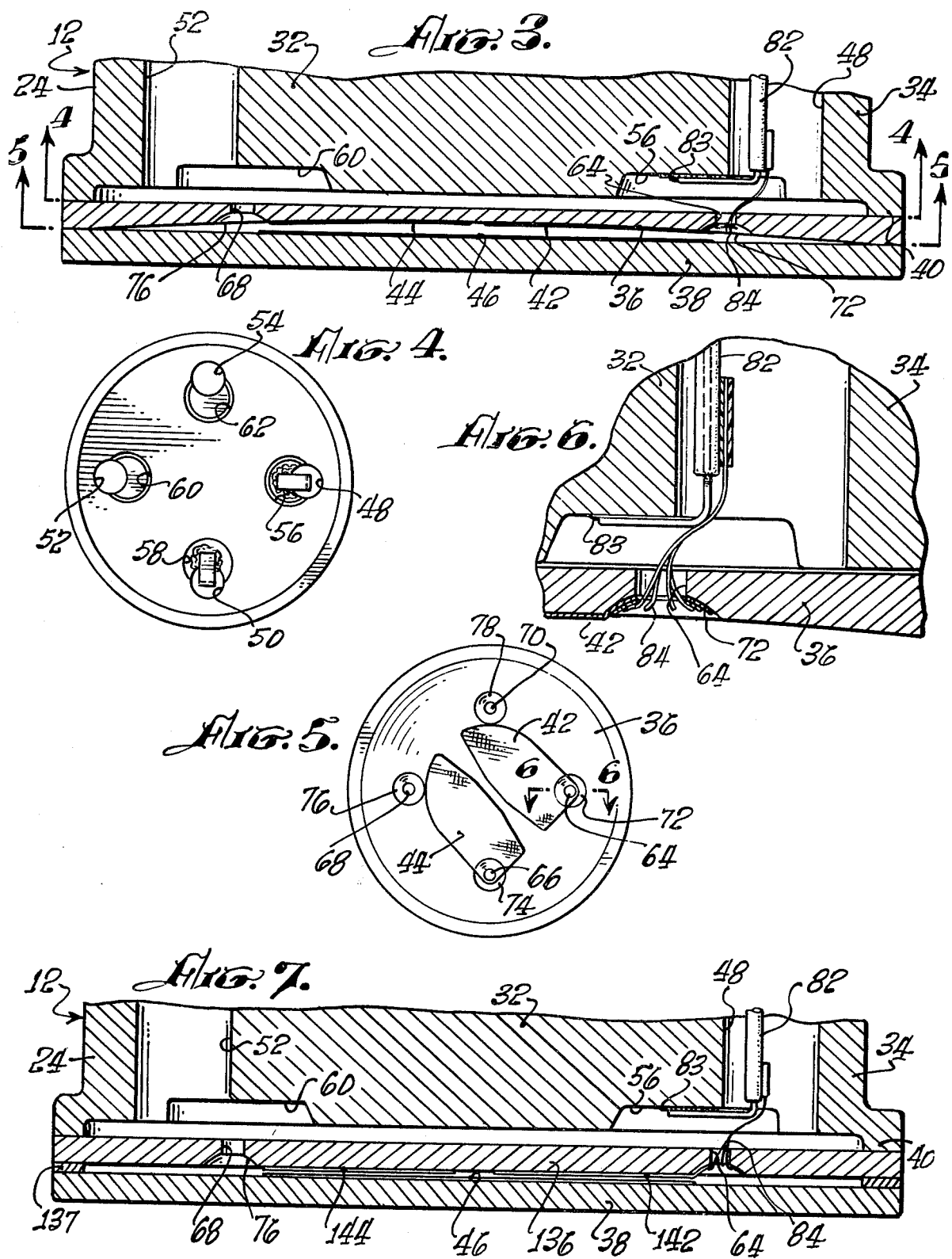

COMPENSATED PRESSURE TRANSDUCER

This is a continuation of application Ser. No. 223,462 filed Feb. 4, 1972, now abandoned.

BACKGROUND OF THE INVENTION

The environment within which an instrument is disposed may subject the instrument to adverse stressing which may be random in occurrence or variable in time duration. One of the stresses to which aircraft instruments may be subjected is that of acceleration due to vibration and/or steady state accelerating forces such as G-load. For example, a pressure transducer for acquiring static or dynamic ambient atmospheric pressure measurements for use in the aircraft instrumentation may comprise a pressure sensitive element or member such as a diaphragm subjected on one side to a vacuum and on the other side to the ambient atmospheric pressure to be measured. Unless the sensitivity of the instrument is reduced to an undesirably low level, vibration of the airframe within which the transducer is mounted may provide a background of unwanted signal information (usually designated as "jitter" or "grass") which may mask pertinent signal information provided by small but significant pressure variations.

In addition, the transducer may be subjected to relatively large steady state acceleration forces of uncertain duration during critical aircraft maneuvers, with consequent false signals fed into the aircraft instrumentation.

It is an object of the present invention to provide a transducer which compensates for stress forces, in particular vibration and acceleration forces. A transducer according to the present invention has compensation for both vibration and steady state accelerating forces applied to it from any direction, without degradation or desensitization of its output by the compensating means.

SUMMARY OF THE INVENTION

The problems of the prior art transducers are solved by the transducer of the present invention, wherein a compensation diaphragm is superposed adjacent a pressure sensitive diaphragm having one side subject to the pressure of a gaseous fluid whose pressure variations are to be measured. The other surface of the pressure sensitive diaphragm and both surfaces of the compensation diaphragm are subject to the same reference pressures, usually that of a hard vacuum or a known reference pressure in a closed chamber.

Facing surfaces of the diaphragms are provided with deposited metal electrodes which are coupled by conductors to an inductance, the capacitor characteristics of the electrodes forming a tank circuit with the inductance which may be coupled by known conductor or electromagnetic means to a signal conditioning circuit to provide signal information on variation of the separation of the capacitor electrodes upon the occurrence of spacing variations of the diaphragms caused by fluid pressure changes.

BRIEF DESCRIPTION OF THE DRAWINGS

FIG. 3 is an enlarged fragmentary view of the diaphragm arrangement of FIG. 4;

FIG. 4 is a reduced scale view in plan, taken on the line 4—4 of FIG. 3;

FIG. 5 is a view similar to FIG. 4 taken on the line 5—5 of FIG. 3;

FIG. 6 is a fragmentary elevation view in cross-section, taken on the line 6—6 of FIG. 5; and FIG. 7 is a view similar to FIG. 3, showing an alternate embodiment.

DESCRIPTION OF THE PREFERRED EMBODIMENTS

Figure 1:
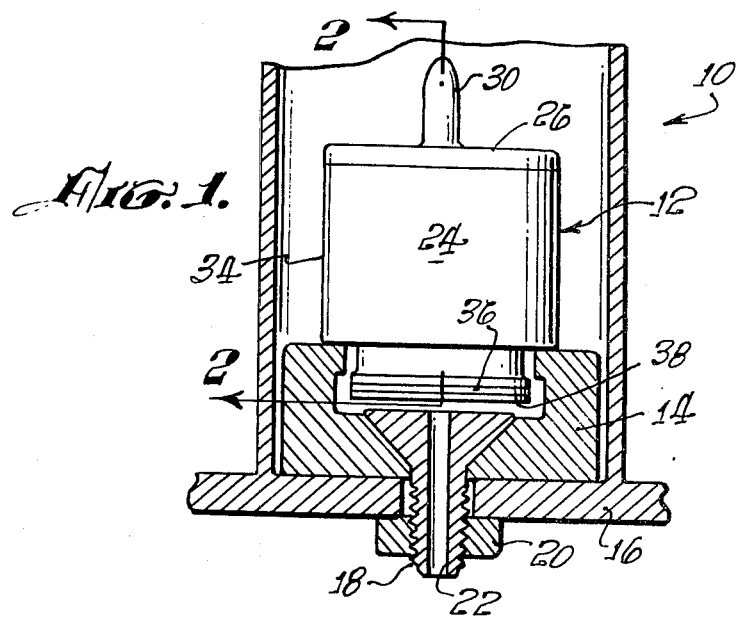
FIG. 1 is an elevation view, partly in cross-section of a portion of an instrument employing the transducer of the invention.

Referring to FIG. 1 there is shown a portion of an instrument 10 comprising a pressure transducer 12 disposed on an adapter 14 which is secured to the wall 16 of the instrument 10 by means of a bolt 18 and nut 20. Preferably formed of silica glass, both the transducer 12 and adapter 14 are readily secured together by a bonding cement so as to provide a substantially leak-proof seal against loss of fluid pressure applied to the lower face of the transducer 12 through a passageway 22 in the bolt 18.

Figure 2:
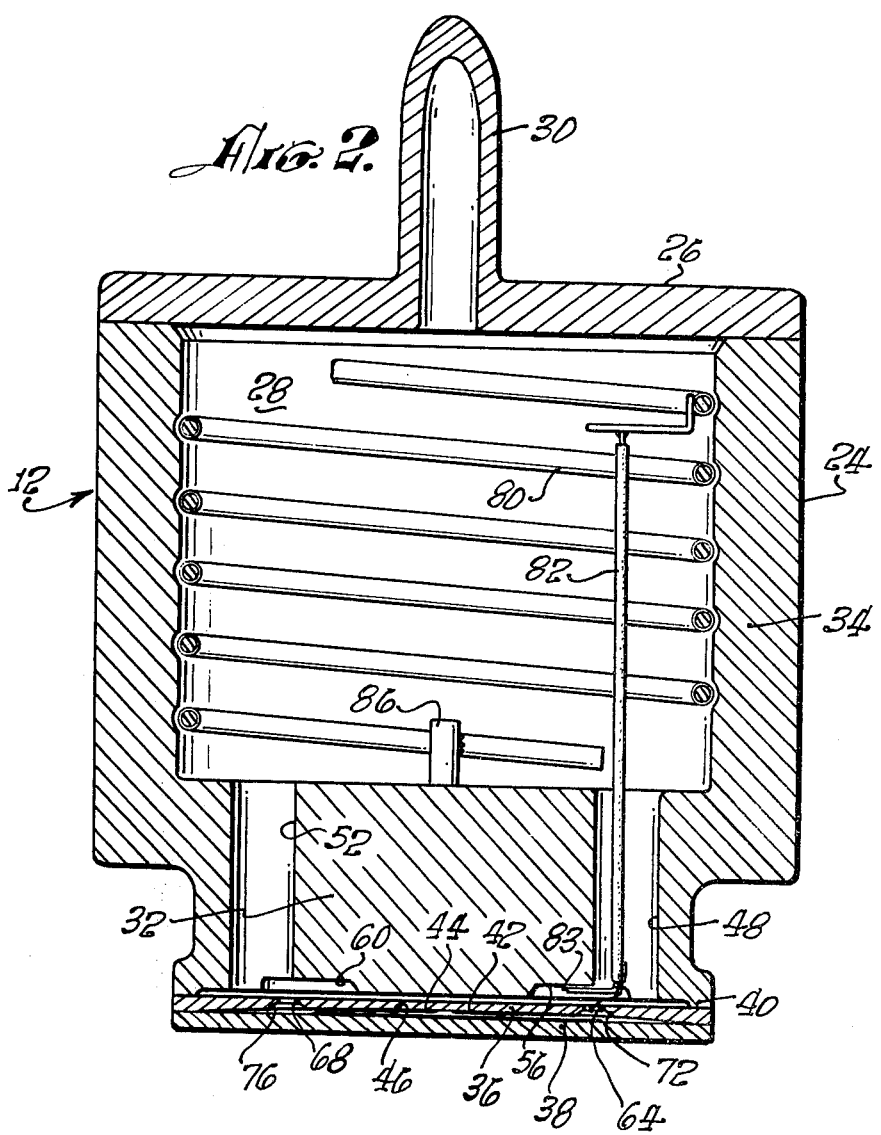
FIG. 2 is an enlarged view in cross-section, taken on the line 2—2 of FIG. 1.

As seen in FIG. 2, the transducer 12 comprises a cup-shaped housing 24 with a cap 26 cemented to the upper edge thereof to form a chamber 28 which may be evacuated through a seal-off tube 30. For purposes of rigidity, the bottom wall 32 of the housing 24 is preferably of substantially greater thickness than the side wall 34 so as to provide a substantially solid support for the stress force sensitive members shown here as diaphragms 36 and 38 whose peripheral edges are secured by bonding to the somewhat flared and shouldered lip 40 at the lower end of the bottom wall 32.

From a fabrication standpoint it is preferred that the diaphragms 36 and 38 be discs of circular configuration for securement to a circular lip 40, although it will be apparent to those skilled in the art that such circular configuration is not an absolute requirement for practising the invention. Preferably, the proportions of the two diaphragms, i.e. the thickness and diameter, are such that the first mode of vibration is far in excess of any exciting frequency that the transducer will be subjected to. This results in both diaphragms moving in phase at all times whether subjected to steady state accelerating or vibratory forces.

It will be observed that the edge of diaphragm 36 is restrained with a greater amount of "fixity" than the edge of diaphragm 38 since the edge of diaphragm 36 has one narrow face band bonded to the lip 40 and a narrow face band of the other face bonded to a narrow face band of the edge of diaphragm 38, this latter bonding being the only restraint of diaphragm 38. Consequently it is preferred to fabricate the diaphragm 36 somewhat thinner than diaphragm 38. To accomplish acceleration and vibration compensation, it will be appreciated, of course, that the diaphragms 36 and 38 need not necessarily be fabricated of the same materials, nor that they be of substantially the same diameter. Design considerations in a particular case may dictate otherwise, in which case the diaphragm thickness consideration may depart from the description given herein. For example, the preferred transducer embodiment has been described as fabricated from silica glass material with the diaphragm 38 subjected to a gaseous pressure. If the fluid to which the diaphragm is subjected is corrosive or degrading in character it may be necessary to make provision on the fluid sensitive face for such a condition by, for example, fabricating portions of the transducer of different materials. In any event, an important characteristic will be that the diaphragms have substantially equal natural frequencies.

In the embodiment of FIGS. 1–3, the lower face of diaphragm 36 is slightly concave with a spherical configuration as best seen in exaggerated form on FIG. 3. This is so in order that a pair of deposited metal electrodes 42 and 44 may be disposed thereon directly opposite the adjacent deposited metal electrode 46 on the upper face of the diaphragm 38. The electrodes 42 and 44 are adapted to coupling with an electronic circuit as explained hereinafter with the electrode 46 acting passively as common to the electrodes 42 and 44. Thus the combination of electrodes 42, 44 and 46 has the electrical characteristic of two capacitors in series.

Referring to FIG. 4 a bottom plan view of the bottom wall 32 shows the wall as provided with four passageways 48, 50, 52 and 54 communicating between the evacuated, reference pressure chamber 28 and the top surface of the diaphragm 36. Four counterbores 56, 58, 60 and 62 merge with the passageways. The number of passageways and counterbores is purely arbitrary since there could be more or less, as preferred. Also, referring to FIG. 5, it is seen that the diaphragm 36 is provided with a like number of passageways 64, 66, 68 and 70 being essentially juxtaposed as a prolongation of the passageways 48, 50, 52 and 54. The passageways in diaphragm 36 provide communication between opposite surfaces thereof, so that diaphragm 36 has zero pressure differential across it and diaphragm 38 is subject on its upper face to the reference vacuum in chamber 28.

Preferably the lower ends of the passageways 62, 64, 66 and 68 are countersunk at 72, 74, 76 and 78, respectively. The deposited metal of electrodes 42 and 44 extends into countersinks 72 and 74, respectively, for a purpose to be described.

Referring to FIG. 2 there is shown an inductance coil 80 disposed on and bonded to the interior surface of the wall 34. The upper end of the coil 80 has the upper end of a conductor 82 secured to it, the lower end of the conductor 82 being secured by bonding to the wall of counterbore 56, as best seen at 83 in FIGS. 3 and 6. The deposited metal of electrode 42 which extends into the countersink 72 has secured to it, as by bonding, one end of conductor means 84 comprising strands of fine wire, the other ends of which are secured to the conductor 82 in the passageway 48.

In like fashion a conductor 86 couples the lower end of the coil 78 with the deposited metal of electrode 44 which extends into the countersink 74. Thus the combination of the coil 80 with the capacitor electrodes 42, 44 and 46 provide a tank circuit whose resonant characteristics can be made to vary with variations of the fluid pressure applied across diaphragm 38. This tank circuit can be coupled by any one of several known ways to an external indicating or using circuit. For example, a pickup coil or coils (not shown) can be wound around the outer surface of the side wall 34 in electromagnetic coupling relationship with coil 80, the pickup coil or coils being adapted for coupling in an oscillator circuit whose frequency will then reflect the fluid pressure applied to diaphragm 38, as will be apparent to those skilled in the art. On the other hand, if direct coupling is preferable, conductor leads (not shown) may be provided through the wall of the housing 24 to be coupled directly to the terminal points of the conductors 82 and 86 with the inductance coil 80. Or, if desired, the coil 80 may be done away with and the external conductors led through the housing wall to be coupled solely to the upper ends of the condutors 82 and 86, as will be apparent to those skilled in the art.

Referring to FIG. 7, an alternate embodiment is shown as comprising stress force sensitive members 136 and 38. A narrow face band on the upper face of diaphragm 136 is bonded to the lip 40. Spacer means 137 are provided between the narrow face band on the lower face of diaphragm 136 and the narrow space band on the upper face of the diaphragm 38, the edges of the diaphragms 136 and 38 thereby being joined with the lip 40 so as to provide a clearance space between the lower face of the diaphragm 136 and the upper face of the diaphragm 38. The spacer means may take the form of a thin shim or it may be by way of filler material which appears in the bonding process.

The distinguishing feature of the embodiment of FIG. 7 over that of the previously described embodiment resides in the provision of a flat lower surface on the diaphragm 136 as distinguished from the spherically configured concave lower surface of diaphragm 36 in FIGS. 2–3, for example. Thus the deposited metal electrodes 142 and 144 present a substantially plane face to the electrode 46 on diaphragm 38 in the normal resting state with no fluid pressure applied to that diaphragm.

I claim:

1. A transducer comprising first and second stress force sensing deflection diaphragms mounted in face-to-face relationship for deflection thereof by application thereto of first and second stress forces, the diaphragms having edges in sealing engagement, one of the diaphragms having a recessed deflection surface; means for maintaining zero pressure differential across one of said diaphragms; and signal means electrically coupled with said diaphragms for providing an electrical output related to the deflection of one of said diaphragms to said second stress force, electrical output related to the deflection of said one of said diaphragms to said first stress force being substantially prevented by the deflection of the other of said diaphragms to said first stress force.

2. The transducer of claim 1 wherein said recessed deflection surface of said diaphragm comprises a concave surface.

3. A transducer comprising first and second stress force sensing deflection diaphragms disposed in face-to-face relationship; means mounting said diaphragms for deflection thereof by application thereto of first and second stress forces; means for maintaining zero pressure differential across one of said diaphragms, and signal means comprising first and second capacitor electrode elements disposed on said diaphragms in face-to-face relationship, a dielectric medium disposed between said capacitor electrode elements, and an inductance coil coupled with said capacitor electrode elements to form a tank circuit for providing an electrical output related to the deflection of one of said diaphragms to said second stress force, electrical outputs related to the deflection of said one of said diaphragms to said first stress force being substantially prevented by the deflection of the other of said diaphragms to said first stress force.

4. The transducer of claim 3 wherein said diaphragms are disposed outside of said inductance coil.

5. A transducer comprising first and second stress force sensing deflection diaphragms disposed in face-to-face relationship; means mounting said diaphragms for deflection thereof by application thereto of first and second stress forces; means for maintaining zero pressure differential across one of said diaphragms; and signal means comprising first and second capacitor electrode elements disposed on said diaphragms in face-to-face relationship and a third capacitor element disposed on one of said diaphragms in side-by-side relationship to one of said capacitor elements and in face-to-face relationship to said other capacitor element, each of the capacitor electrode elements being movable with its respective diaphragm, and a dielectric medium disposed between said capacitor electrode elements for providing an electrical output related to the deflection of one of said diaphragms to said second stress force, electrical output related to the deflection of said one of said diaphragms to said first stress force being substantially prevented by the deflection of the other of said diaphragms to said first stress force.

6. The transducer of claim 5 in which said dielectric medium between said capacitor electrode elements has a dielectric constant of as great as one.

7. The transducer of claim 5 further comprising an inductance coil, said inductance coil being coupled with said capacitor electrode elements to form a tank circuit.

8. The transducer of claim 7 in which said first and third capacitor electrode elements are electrically wired to said inductance coil.

9. The transducer of claim 7 in which said diaphragms are disposed outside of said coil.

10. A transducer comprising first and second stress force sensing deflection diaphragms disposed in face-to-face relationship; means mounting said diaphragms for deflection thereof by application thereto of first and second stress forces; means for maintaining zero pressure differential across one of said diaphragms; and signal means comprising first and second capacitor electrode elements disposed on said diaphragms in face-to-face relationship, each of the capacitor electrode elements being movable with its respective diaphragm, a dielectric medium disposed between said capacitor electrode elements, an inductance coil, a cup-like transducer housing disposed about said coil and joined therewith, said housing being further joined to said means mounting said diaphragms, and means for electrically coupling said coil to said capacitor electrode elements to form a tank circuit for providing an electrical output related to the deflection of one of said diaphragms to said second stress force, electrical output related to the deflection of said one of said diaphragms to said first stress force being substantially prevented by the deflection of the other of said diaphragms to said first stress force.

11. The transducer of claim 10 in which the inside wall of said housing is grooved for receiving said coil body.

12. The transducer of claim 11 in which said coil is bonded to the wall of said groove.

13. The transducer of claim 10 in which said dielectric medium between said capacitor electrode elements has a dielectric constant of as great as one.

* * * * *